(12) United States Patent
Huang et al.

(10) Patent No.: US 11,399,122 B2
(45) Date of Patent: Jul. 26, 2022

(54) ADJUSTABLE CAMERA MODULE AND ASSEMBLY TEST METHOD THEREFOR

(71) Applicant: NINGBO SUNNY OPOTECH CO., LTD., Yuyao (CN)

(72) Inventors: Zhen Huang, Yuyao (CN); Xiaodi Liu, Yuyao (CN); Zhenyu Chen, Yuyao (CN)

(73) Assignee: NINGBO SUNNY OPOTECH CO., LTD., Yuyao (CN)

(*) Notice: Subject to any disclaimer, the term of this patent is extended or adjusted under 35 U.S.C. 154(b) by 0 days.

(21) Appl. No.: 17/276,633

(22) PCT Filed: Aug. 28, 2019

(86) PCT No.: PCT/CN2019/102957
§ 371 (c)(1),
(2) Date: Mar. 16, 2021

(87) PCT Pub. No.: WO2020/057331
PCT Pub. Date: Mar. 26, 2020

(65) Prior Publication Data
US 2022/0046148 A1    Feb. 10, 2022

(30) Foreign Application Priority Data

Sep. 17, 2018  (CN) .......................... 201811081788.8

(51) Int. Cl.
*H04N 5/225* (2006.01)
*G03B 3/10* (2021.01)
(Continued)

(52) U.S. Cl.
CPC ............ *H04N 5/2253* (2013.01); *G03B 3/10* (2013.01); *G03B 17/12* (2013.01); *H04N 17/002* (2013.01)

(58) Field of Classification Search
CPC .. H04N 5/2253; H04N 5/2254; H04N 5/2251; H04N 5/23212; G03B 3/10;
(Continued)

(56) References Cited

U.S. PATENT DOCUMENTS

2010/0040355 A1   2/2010  Craen et al.
2012/0307089 A1  12/2012  Rukes
(Continued)

FOREIGN PATENT DOCUMENTS

CN    103782584 A    5/2014
CN    104075803 A   10/2014
(Continued)

OTHER PUBLICATIONS

Machine English Translation, JP 2014052601 A, Mar. 20, 2014 (Year: 2014).*

(Continued)

*Primary Examiner* — Nelson D. Hernández Hernández
(74) *Attorney, Agent, or Firm* — Birch, Stewart, Kolasch & Birch, LLP

(57) ABSTRACT

An adjustable camera module and an assembly test method therefor. The assembly test method for the adjustable camera module comprises: measuring a static tilt amount between the optical lens sheet group and the photosensitive assembly by performing a defocus curve test on the adjustable camera module; analyzing a static adjusting electric quantity of each adjustment coil of an adjustment coil group according to the static tilt amount; and burning the static adjusting electric quantity required by each adjustment coil so as to reduce process requirements.

20 Claims, 13 Drawing Sheets

(51) Int. Cl.
*H04N 17/00* (2006.01)
*G03B 17/12* (2021.01)

(58) Field of Classification Search
CPC ...... G03B 17/12; G03B 17/002; G03B 30/00; G03B 43/00
See application file for complete search history.

(56) References Cited

U.S. PATENT DOCUMENTS

| | | |
|---|---|---|
| 2014/0009631 A1* | 1/2014 | Topliss ................ H04N 5/2257 348/208.11 |
| 2014/0285799 A1 | 9/2014 | Sakurai |
| 2015/0009400 A1 | 1/2015 | Shin et al. |

FOREIGN PATENT DOCUMENTS

| | | |
|---|---|---|
| CN | 105025290 A | 11/2015 |
| CN | 107655418 A | 2/2018 |
| CN | 107656418 A | 2/2018 |
| CN | 107948638 A | 4/2018 |
| JP | 2014-52601 A | 3/2014 |
| JP | 2014052601 A * | 3/2014 |
| JP | 2015-111758 A | 6/2015 |

OTHER PUBLICATIONS

International Search Report for PCT/CN2019/102957 dated Oct. 30, 2019.
Extended European Search Report for European Application No. 19861367.1, dated Sep. 13, 2021.

* cited by examiner

ADJUSTABLE CAMERA MODULE AND ASSEMBLY TEST METHOD THEREFOR

CROSS REFERENCE TO RELATED APPLICATIONS

This application is the National Phase of PCT International Application No. PCT/CN2019/102957, filed on Aug. 28, 2019, which claims priority under 35 U.S.C. 119(a) to Patent Application No. 201811081788.8, filed in China on Sep. 17, 2018, all of which are hereby expressly incorporated by reference into the present application.

TECHNICAL FIELD

The present disclosure relates to the field of optics, and more specifically, to an adjustable camera module and an assembly test method therefor, wherein a quantity of electric charge corresponding to a tilt amount of an optical lens sheet group is preset in the production stage to facilitate the improvement of the resolution.

BACKGROUND

With the development of photo optics technology, camera modules have become necessary modules for mobile devices such as mobile phones. Compared with professional camera devices, people usually choose to use mobile phones to take a photograph, because they are not only smart and convenient, but also have a higher price/performance ratio. However, as consumers have higher and higher requirements for photographing performance, the production and design requirements for camera module manufacturers have become higher and higher. At the same time, the development of technology and the continuous iteration of products require the camera module manufacturers to shorten the production cycle as much as possible and quickly adapt to the development speed of the industry.

However, in the assembly process of the camera module, whether it is the assembly of the lens and the motor, or the assembly of the motor and the lens holder, or the assembly of the lens holder and the circuit board, there will be assembly tolerances. These assembly tolerances will eventually accumulate and finally lead to the tilt between the lens and the chip of the camera module. That is, the imaging surface of the lens does not coincide with the photosensitive surface of the photosensitive chip, which thus causes the resolution of the camera module to decrease.

In the prior art, some camera module manufacturers use AA technology (active alignment technology) to align the lens with the photosensitive chip. However, the AA technology is used to adjust the position and orientation of the entire actuator, and if there is an assembly tilt problem when the lens and actuator are assembled, it is likely to exceed the adjustment range of the AA technology, or increase the adjustment difficulty of the AA technology. In other words, the AA technology cannot completely ensure the alignment. If the alignment is desired to be realized by the AA technology, then the process level requirements and costs of the camera module manufacturer will all increase.

Further, because the magnet is cheap or the coil is offset, the lens will be dynamically tilted during the focusing of the actuator and the movement of the lens. Moreover, the dynamic tilt amount of the lens will be different for different focus positions. If the AA technology is used, it is difficult to adjust the position of the actuator for different focus positions, which not only requires a lot of work, but also takes time and effort, and further increases the difficulty.

SUMMARY

An objective of the present disclosure is to provide an adjustable camera module and an assembly test method therefor, wherein the adjustable camera module adjusts a tilt amount of an optical lens sheet group by supplying an adjusting current to an adjustment coil group, realizing the alignment of the optical lens sheet group and a photosensitive chip and thus improving the resolution.

An objective of the present disclosure is to provide an adjustable camera module and an assembly test method therefor, wherein during the production process, an adjusting current required by an adjustment coil group is burned (burn: fixedly record), an adjusting quantity of electric charge is preset so that it is convenient for the adjustment coil group to obtain the preset adjusting quantity of electric charge when in use, and the tilt amount of an optical lens sheet group is adjusted to realize the alignment of the optical lens sheet group and a photosensitive chip and thus improve the resolution.

Another objective of the present disclosure is to provide an adjustable camera module and an assembly test method therefor, wherein the difficulty of the AA alignment step is reduced by presetting the adjusting quantity of electric charge of the adjustment coil group, so that the AA alignment step needs to be adjusted to be within the adjustable range of the adjustment coil group.

Another objective of the present disclosure is to provide an adjustable camera module and an assembly test method therefor, wherein the difficulty of the AA alignment step is reduced, which reduces the requirements on the production technology of the camera module manufacturer and improves the product yield.

Another objective of the present disclosure is to provide an adjustable camera module and an assembly test method therefor, wherein the AA alignment step is replaced by presetting the adjusting quantity of electric charge of the adjustment coil group, reducing the technical requirements for camera module manufacturers.

Another objective of the present disclosure is to provide an adjustable camera module and an assembly test method therefor, wherein by presetting the adjusting quantity of electric charge of the adjustment coil group, the difficulty of the AA alignment step is reduced or the AA alignment step is replaced, shortening the generation cycle, and adapting to fast-paced product iteration.

An objective of the present disclosure is to provide an adjustable camera module and an assembly test method therefor, which can be used to adjust the static tilt amount between the optical lens sheet group and the photosensitive chip.

An objective of the present disclosure is to provide an adjustable camera module and an assembly test method therefor, which can be used to adjust the dynamic tilt amount between the optical lens sheet group and the photosensitive chip.

Another objective of the present disclosure is to provide an adjustable camera module and an assembly test method therefor, wherein by performing a defocus curve test on the adjustable camera module, the static tilt amount (tilt) is measured, and a static adjusting quantity of electric charge is preset so as to realize the adjustment of the static tilt amount. Of course, those skilled in the art can measure the assembly tilt amount by other methods.

Another objective of the present disclosure is to provide an adjustable camera module and an assembly test method therefor, wherein the optical lens sheet group is driven to move to different focus positions, the dynamic tilt amount is measured by monitoring the tilt amount of the optical lens sheet group under different strokes, and a dynamic adjusting quantity of electric charge is preset so as to realize the adjustment of the dynamic tilt amount.

Another objective of the present disclosure is to provide an adjustable camera module and an assembly test method therefor, wherein by presetting the dynamic adjusting quantity of electric charge corresponding to each focus position, the dynamic tilt amount of different focus positions can be automatically adjusted, reducing the scrap rate of the product and reducing the production costs.

Another objective of the present disclosure is to provide an adjustable camera module and an assembly test method therefor, wherein the adjustment coil group can replace the AF coil (auto focus coil), and a preset driving electric quantity is used to compensate for the tilt amount and then realize auto focusing. That is to say, the adjustable actuator of the present disclosure has a reduced overall volume size compared with the existing AF actuator, which conforms to the current trend of overall lightness and thinness.

According to an aspect of the present disclosure, the present disclosure further provides an assembly test method for an adjustable camera module, comprising:
(a) assembling an optical lens sheet group, an adjustable actuator and a photosensitive assembly to form an adjustable camera module;
(b) measuring a static tilt amount between the optical lens sheet group and the photosensitive assembly by performing a defocus curve test on the adjustable camera module;
(c) analyzing a static adjusting electric quantity of each adjustment coil of an adjustment coil group according to the static tilt amount;
(d) supplying the static adjusting electric quantity required by each of the adjustment coils to the adjustable camera module; and
(e) measuring an adjusted defocus curve, wherein if the defocus curve is measured after adjustment, and it indicates that the position difference concerning the static tilt amount is within an acceptable error range, then the static adjusting electric quantity required by each of the adjustment coils is burned; and if a position difference exceeds an acceptable error range, then the steps (b), (c) and (d) are repeated.

In an embodiment of the present disclosure, the assembly test method for the adjustable camera module further comprises the following steps:
(f) measuring dynamic tilt amounts corresponding to the adjustable camera module at different focus positions; and
(g) according to the dynamic tilt amounts, analyzing dynamic adjusting electric quantities required by each of the adjustment coils of the adjustment coil group at the respective focus positions.

In an embodiment of the present disclosure, the assembly test method for the adjustable camera module further comprises the following steps after the step (e):
(h) driving the optical lens sheet group to move to a different focus position, and supplying a dynamic adjusting electric quantity required by each of the adjustment coils corresponding to the focus position to the adjustable camera module; and
(i) measuring an adjusted dynamic tilt amount, and if the adjusted dynamic tilt amount is within an acceptable error range, burning the dynamic adjusting electric quantity required by each of the adjustment coils corresponding to the focus position;
and if the adjusted dynamic tilt amount exceeds the acceptable error range, repeating the step (f) and the step (g).

In an embodiment of the present disclosure, the assembly test method for the adjustable camera module further comprises the following steps:
(j) according to the different focus position, presetting a driving current magnitude corresponding to each of the adjustment coils.

In an embodiment of the present disclosure, the assembly test method for the adjustable camera module further comprises the following steps:
(k) after supplying the burned static adjusting electric quantity and the dynamic adjusting electric quantity of the corresponding focus position to the adjustable camera module, supplying a preset driving current magnitude corresponding to each of the adjustment coils; and
(l) detecting whether focusing is successful after a driving electric quantity is input, and if the focusing is successful, burning the driving current magnitude corresponding to each of the adjustment coils; and if it is unsuccessful, repeating the step (j) and the step (k).

According to another aspect of the present disclosure, the present disclosure further provides an assembly test method for an adjustable camera module, comprising:
(A) assembling an optical lens sheet group, an adjustable actuator and a photosensitive assembly to form an adjustable camera module;
(B) measuring dynamic tilt amounts corresponding to the adjustable camera module at different focus positions;
(C) according to the dynamic tilt amounts, analyzing dynamic adjusting electric quantities required by each of the adjustment coils of the adjustment coil group at the respective focus positions;
(D) driving the optical lens sheet group to focus, and supplying the dynamic adjusting electric quantity required by each of the adjustment coils corresponding to the focus position to the adjustable camera module; and
(E) measuring an adjusted dynamic tilt amount, and if the adjusted dynamic tilt amount is within an acceptable error range, burning the dynamic adjusting electric quantity required by each of the adjustment coils corresponding to the focus position;
and if the adjusted dynamic tilt amount exceeds the acceptable error range, repeating the step (B) and the step (C).

According to another aspect of the present disclosure, the present disclosure further provides an adjustable camera module, comprising:
the adjustable camera module being manufactured according to any one of the assembly test methods described above, wherein the adjustable actuator supports the optical lens sheet group and is mounted on the top of the photosensitive assembly, and the optical lens sheet group corresponds to a photosensitive path of the photosensitive assembly.

In an embodiment of the present disclosure, the adjustable actuator comprises a frame main body, an adjustment coil group, at least one magnet and a base; wherein the frame main body and the base are coupled to define an installation cavity, and the elastic assembly, the magnet, the optical lens sheet group and the adjustment coils are accommodated and fixed in the installation cavity; and wherein when corresponding static adjusting electric quantities are supplied to the adjustment coil group, under the action of the magnet, the optical lens sheet group is driven by the adjustment coils to adjust a static tilt amount, so as to facilitate the optical lens sheet group to focus.

In an embodiment of the present disclosure, when the optical lens sheet group is driven to focus, the adjustment coils are supplied with the dynamic adjusting electric quantities corresponding to the focus position, and under the action of the magnet, the optical lens sheet group is driven by the adjustment coils to compensate for the dynamic tilt amount.

In an embodiment of the present disclosure, the adjustment coil group is fixed on an outer peripheral wall of the optical lens sheet group, and the respective adjustment coils are distributed at intervals; and wherein the magnet is fixed to an inner side wall of the frame main body.

In an embodiment of the present disclosure, the respective adjustment coils are fixed to an inner side wall of the frame main body at intervals, and the magnets are fixed to an outer side wall of the lens barrel at intervals.

In an embodiment of the present disclosure, the adjustable actuator further comprises an auto focus coil; wherein the auto focus coil surrounds the optical lens sheet group; and wherein when corresponding static adjusting electric quantities are supplied to the adjustment coil group to compensate for the static tilt amount, then the auto focus coil realizes auto focus.

In an embodiment of the present disclosure, the adjustable actuator further comprises an auto focus coil; wherein the auto focus coil surrounds the optical lens sheet group; and wherein after the auto focus coil realizes auto focus, the adjustment coil group is supplied with corresponding static adjusting electric quantities to compensate for the static tilt amount.

In an embodiment of the present disclosure, the adjustable actuator further comprises an auto focus coil; wherein the auto focus coil surrounds the optical lens sheet group; and wherein when the optical lens sheet group is driven by the auto focus coil to focus, the adjustment coil group is supplied with corresponding dynamic adjusting electric quantities to compensate for the dynamic tilt amount.

In an embodiment of the present disclosure, when corresponding static adjusting electric quantities and/or dynamic adjusting electric quantities are supplied to the adjustment coil group to compensate for the static tilt amount and/or dynamic tilt amount, then a driving electric quantity is supplied, and the adjustment coil group drives the optical lens sheet group to automatically focus.

DETAILED DESCRIPTION

Figure 1:
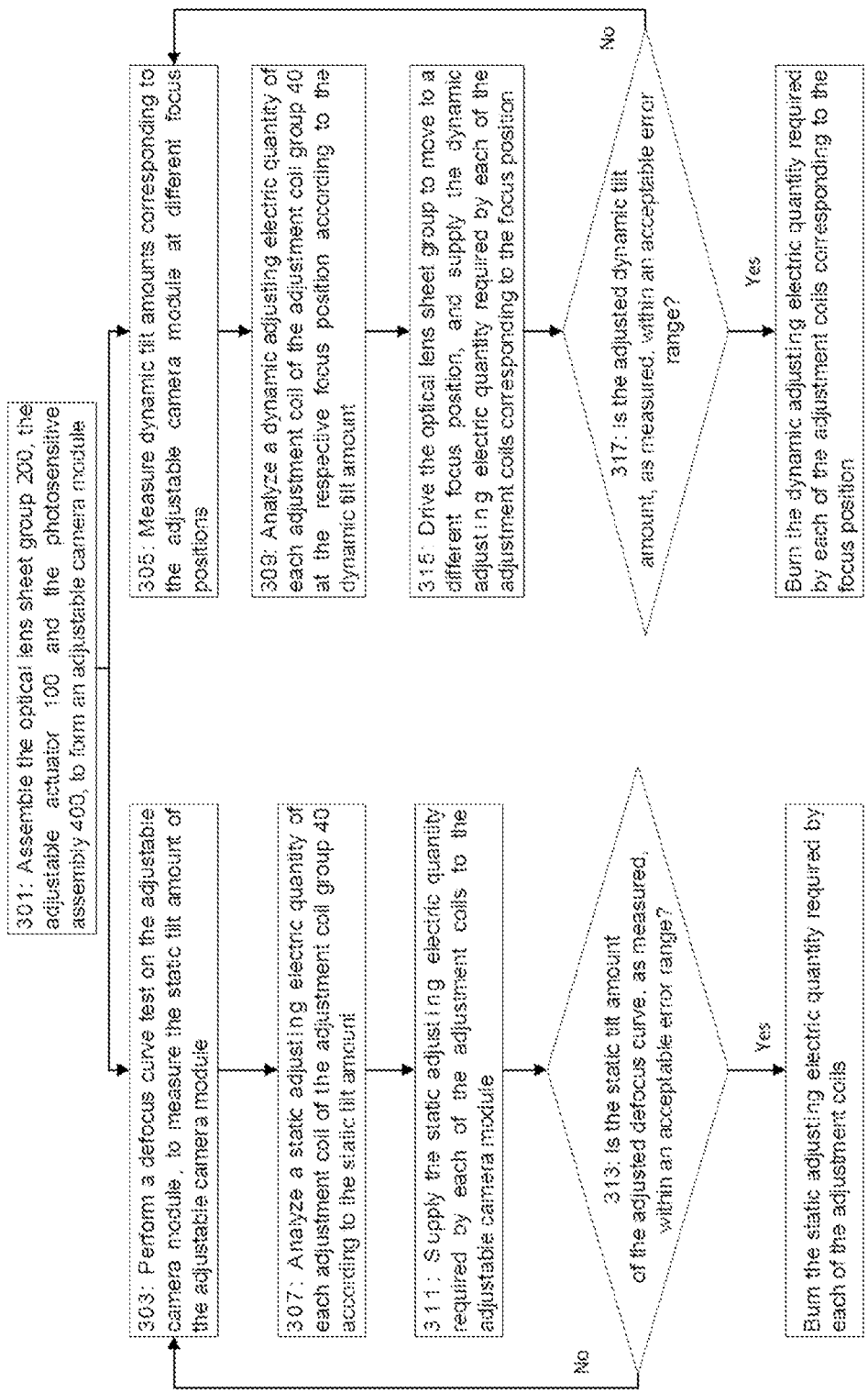
FIG. 1 is a flow chart of an assembly test method for an adjustable camera module according to a preferred embodiment of the present disclosure.
Figure 2:
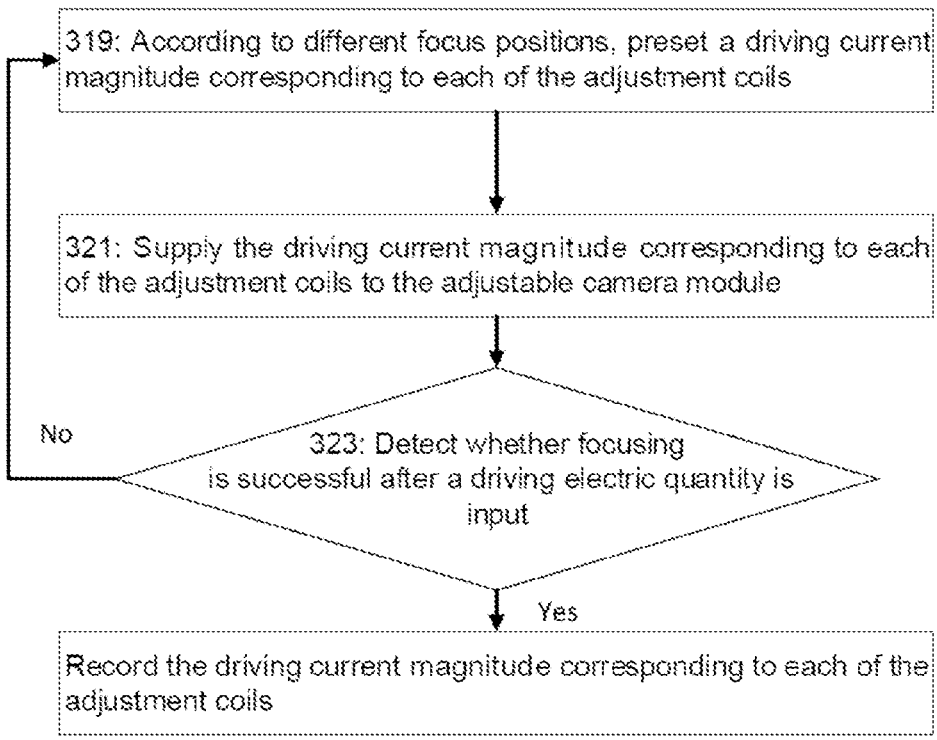
FIG. 2 is a flow chart of an assembly test method for an adjustable camera module according to another embodiment of the present disclosure.

The following description is presented to disclose the present application to enable those skilled in the art to practice the present disclosure. Preferred embodiments in the following description are by way of example only, and other obvious modifications are conceivable to those skilled in the art. The basic principles of the present disclosure as defined in the following description may be applied to other implementations, modifications, improvements, equivalents, and other technical solutions without departing from the spirit and scope of the present application.

It should be understood by those skilled in the art that in the disclosure of the present application, the orientation or positional relationship indicated by the terms "longitudinal", "transverse", "upper", "lower", "front", "back", "left", "right", "vertical", "horizontal", "top", "bottom", "inside", "outside", etc. is based on the orientation or positional relationship shown in the drawings, which is merely for the convenience of describing the present disclosure and simplifying the description, and does not indicate or imply that the mentioned apparatus or element must have a particular orientation and be constructed and operated in the particular orientation. Therefore, the above terms cannot be construed as limiting the present application.

It may be understood that the term "a" or "an" should be understood to mean "at least one" or "one or more", that is, in one embodiment, the number of an element may be one, and in other embodiments, the number of the element may be multiple. The term "a" or "an" cannot be understood as a limitation on the number.

As shown in FIGS. 1 to 10, the present disclosure provides an adjustable camera module and an assembly test method therefor. During the production process, an adjusting current required by an adjustment coil group 40 of an adjustable actuator 100 is burned, and an adjusting quantity of electric charge y is preset, so that it is convenient for the adjustment coil group to obtain the preset adjusting quantity of electric charge when in use. An optical lens sheet group 200 is adjusted to realize the alignment of the optical lens sheet group 200 and a photosensitive chip 410 of a photosensitive assembly 400 to improve the resolution. As shown in FIG. 1, it is a flow chart of a method for producing the actuator of the present disclosure.

Step 301: the optical lens sheet group 200, the adjustable actuator 100 and the photosensitive assembly 400 are assembled to form an adjustable camera module.

The adjustable actuator 100 supports the optical lens sheet group 200 and is mounted on the top of the photosensitive assembly 400. The optical lens sheet group 200 corresponds to a photosensitive path of the photosensitive chip 410 of the photosensitive assembly 400. In the present disclosure, the manner of assembling the optical lens sheet group 200, the adjustable actuator 100 and the photosensitive assembly 400 is not limited, and those skilled in the art can use any executable method to assemble the two.

The optical lens sheet group 200 includes a plurality of optical lens sheets 210 and a lens barrel 220. The optical lens sheets 210 are arranged and fixed in the lens barrel 220 in sequence, and an inner side wall of the lens barrel 220 is suitable for mounting and fixing the corresponding optical lens sheets 210. The method of fixing the optical lens sheet 210 to the inner side wall of the lens barrel 220 is not limited, and may be snapping, embedding, bonding or the like. The adjustable actuator 100 can be assembled with the optical lens sheet group 100 by fixing the lens barrel 220.

Figure 10:
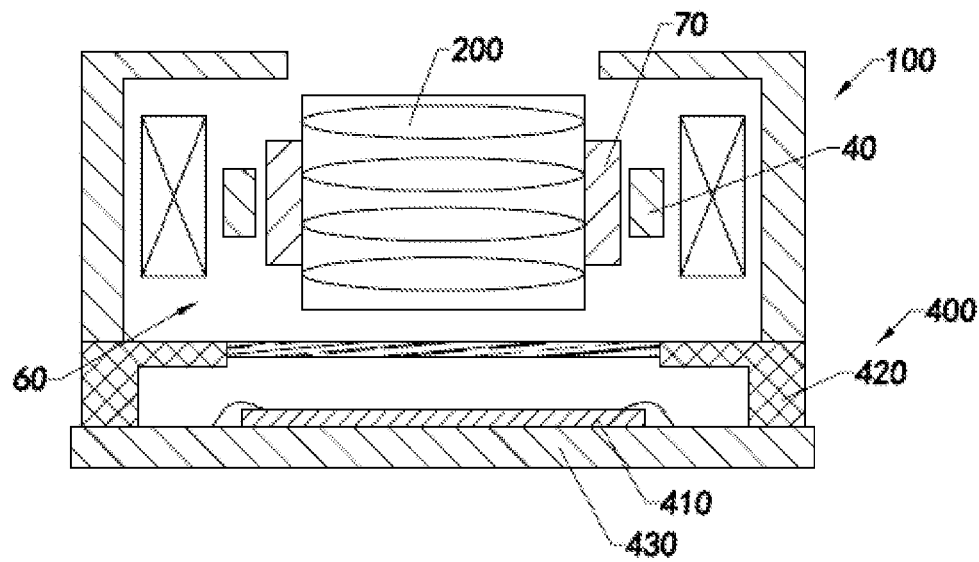
FIG. 10 is a schematic cross-sectional view of an adjustable camera module according to an embodiment of the present disclosure.
Figure 11:
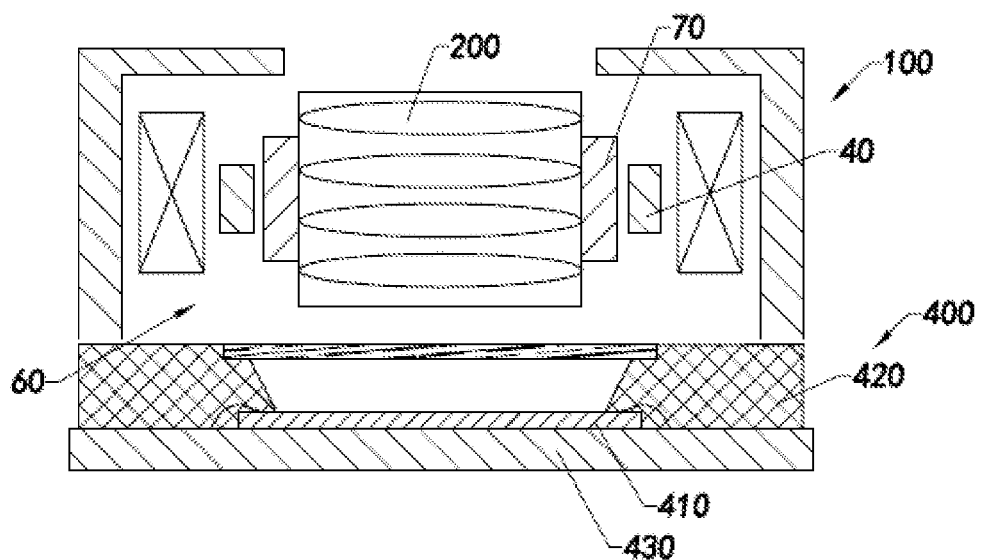
FIG. 11 is a schematic cross-sectional view of an adjustable camera module according to another embodiment of the present disclosure.

The photosensitive assembly 400 includes the photosensitive chip 410, a lens holder 420, and a circuit board 430, and the lens holder 420 encapsulates the photosensitive chip 410 on the circuit board 430. The lens holder 420 has a light window 421 formed on the top of the lens holder, which corresponds to a photosensitive path of the photosensitive chip 410. The photosensitive assembly 400 can be formed by a packaging process such as MOB, MOC, COB or the like, which is not limited here, as shown in FIGS. 10 and 11.

Further, the step 301 may include a step of: assembling the optical lens sheet group 200 and the adjustable actuator 100 by AA alignment technology. The AA alignment technology is not necessary, but module manufacturers can adjust the assembly through the AA alignment technology, and then perform subsequent steps so as to reduce the static tilt amount and adjust the static tilt amount to be within an adjustable range of the adjustment coil group 40.

Step 303: a defocus curve test is performed on the adjustable camera module to measure the static tilt amount of the adjustable camera module.

As mentioned in the background above, due to the assembly tolerance in the assembly process of the camera module, the static tilt amount between the optical lens sheet group 200 and the photosensitive chip 410 is caused, as shown in 3A. The test principle of the defocus curve is as follows: an AF coil or an adjustment coil of the adjustable actuator 100 is powered on so that the optical lens sheet group 200 moves up and down relative to the photosensitive chip 410, and a defocus curve test is performed on the adjustable actuator to record resolution curves of the adjustable camera module at a field of view of 0.8 in four positions of upper left B, upper right E, lower left C, and lower right D of a module test image, which may be, for example, MTF (modulation transfer function) or SFR (spatial frequency response).

It can be understood that in this embodiment, only the field of view of 0.8 is selected for testing as an example, and according to different inclination control requirements and different algorithms, other positions of the module test image or other fields of view may also be selected for testing. It is not a limitation of the present application. In addition, those skilled in the art can know the specific steps and devices used for the defocus curve test, which will not be repeated here.

Figure 3A:
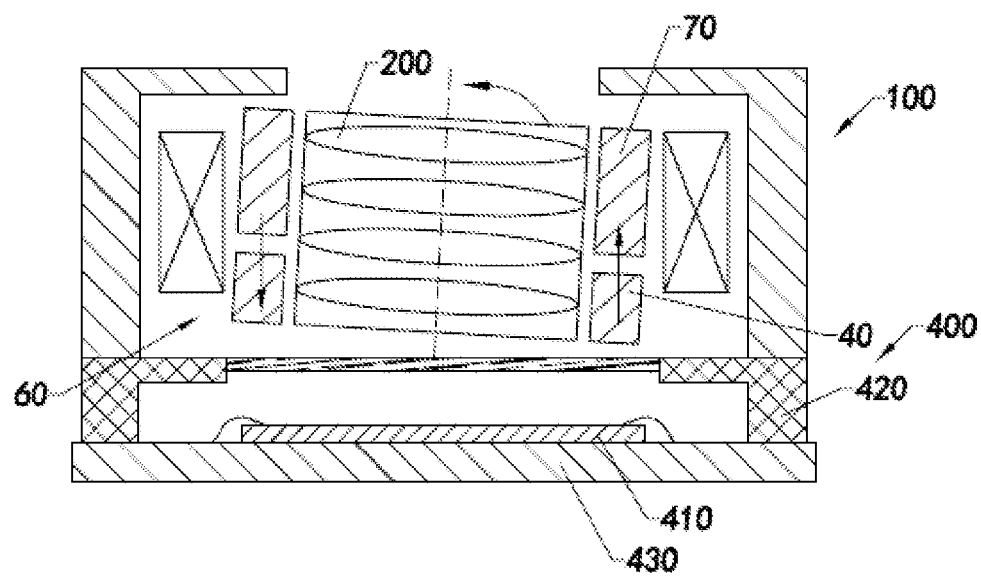
FIG. 3A is a schematic view of a static tilt of an adjustable camera module according to the present disclosure.
Figure 3B:
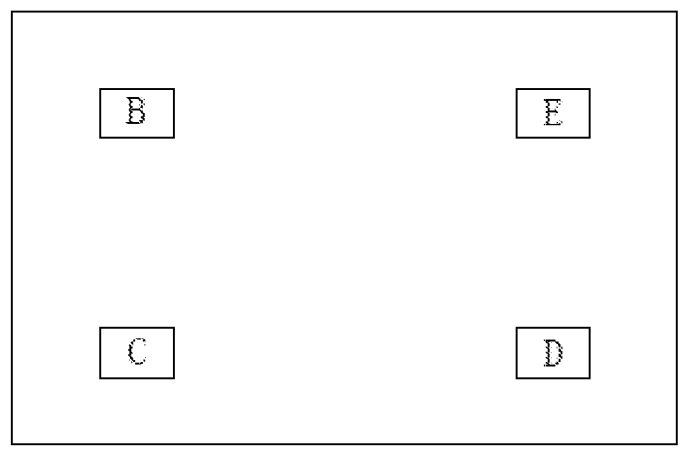
FIG. 3B is a schematic view of a target plate used for a static tilt amount test of an adjustable camera module according to the present disclosure.
Figure 3C:
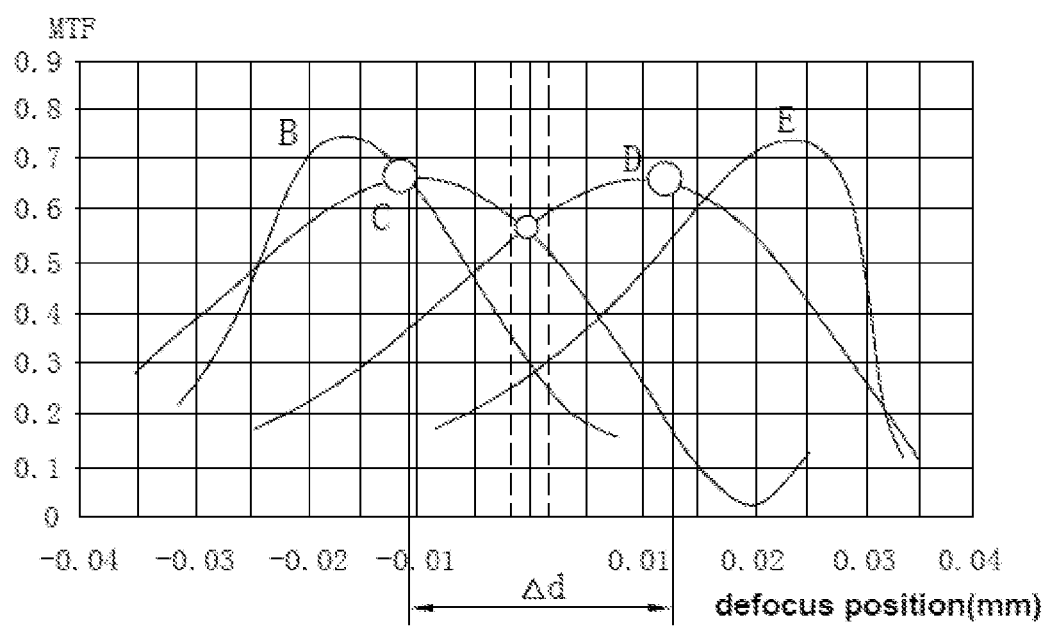
FIG. 3C is a schematic view of a measured defocus curve of a static tilt amount of an adjustable camera module according to the present disclosure.

Further, motor strokes of the adjustable module when imaging is clearest at the upper left B, upper right E, lower left C, and lower right D of the module test image are extracted, that is, the optical lens sheet group 200 corresponds to the focus position at each position of the module test image; and when there is a tilt between the imaging surface of the optical lens sheet group 200 and the photosensitive chip 410, that is, when a static tilt amount exists, there is a difference between the focus positions of the optical lens sheet group 200 at respective positions, and the larger the position difference, the greater the static tilt amount. According to the position difference between the focus positions and an imaging direction of the adjustable camera module, the static tilt amount can be calculated, as shown in FIGS. 3B and 3C.

It can be understood that the up and down movement of the optical lens sheet group 200 relative to the photosensitive chip 410 is also realized by moving the module test image.

Step 305: dynamic tilt amounts corresponding to the adjustable camera module at different focus positions are measured.

Figure 4A:
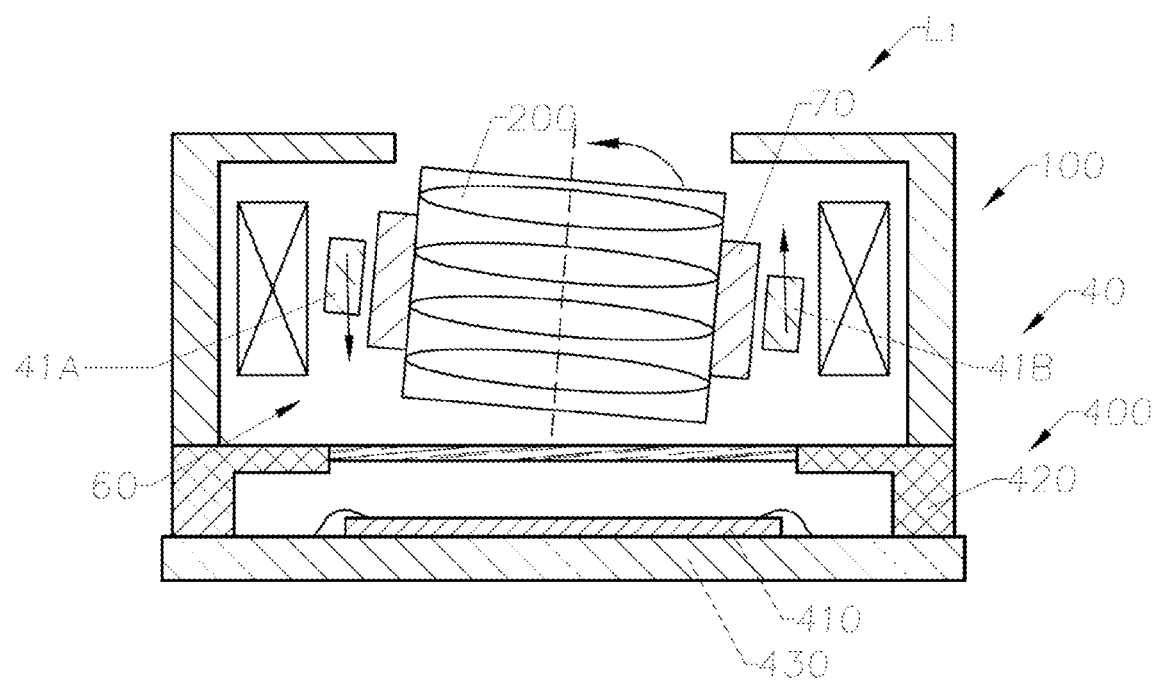
FIGS. 4A and 4B are schematic views of a dynamic tilt of an adjustable camera module according to the present disclosure.
Figure 4B:
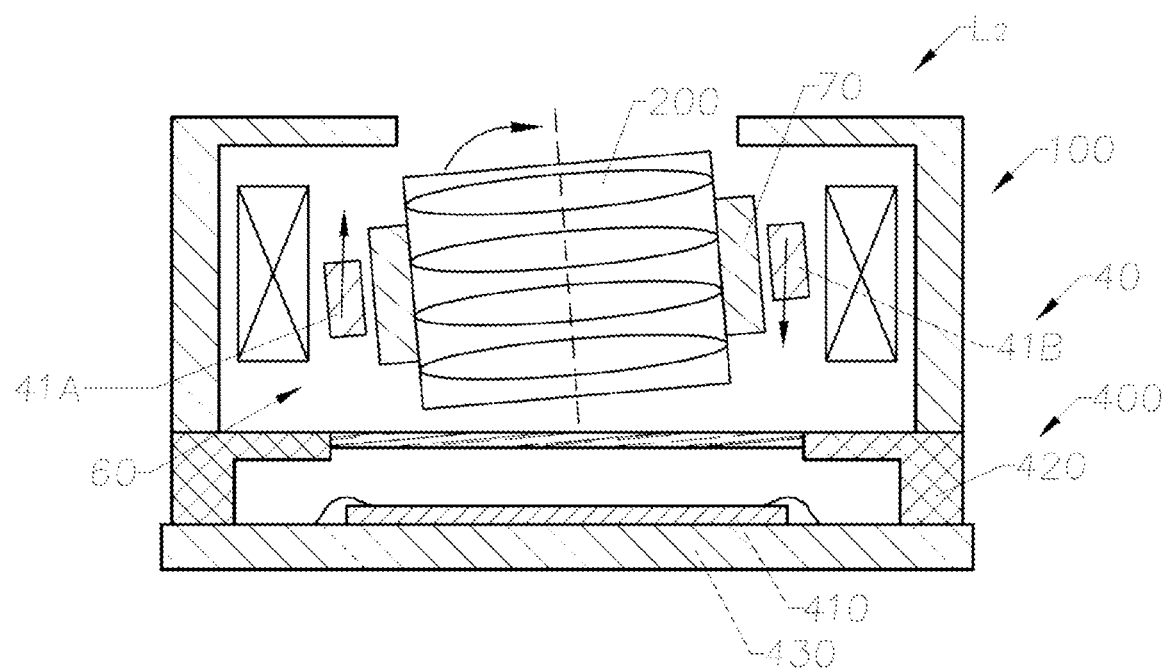
Figure 4C:
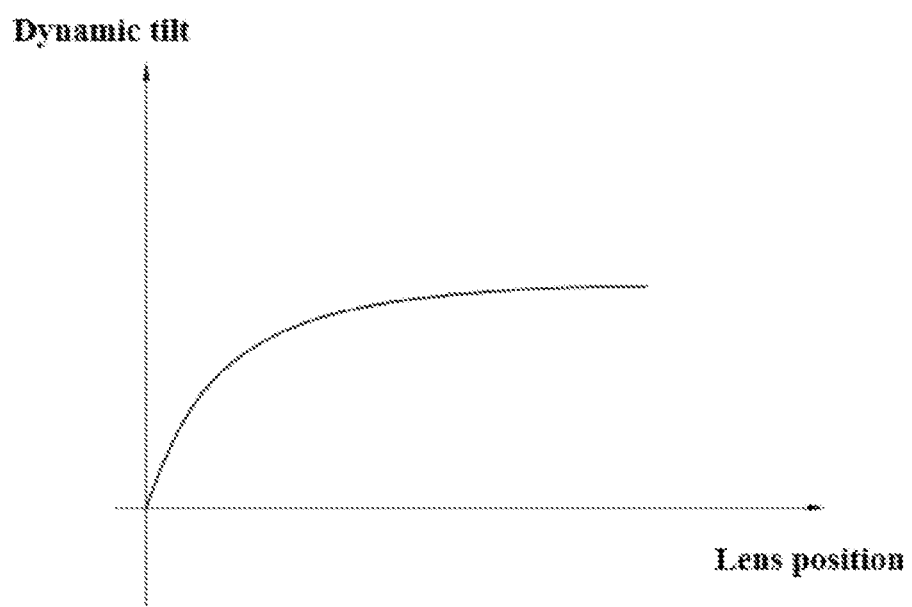
FIG. 4C is a schematic view of a dynamic tilt amount curve of an adjustable camera module according to the present disclosure.

As mentioned in the previous background, due to magnet offset or coil offset, deformation of spring pieces or the like, the lens will be dynamically tilted during the focusing of the actuator and the movement of the lens. Moreover, the dynamic tilt amount of the lens will be different for different focus positions, as shown in FIGS. 4A to 4C.

The test method of the dynamic tilt amount may be as follows: laser light is emitted to a surface of the optical lens sheet group 200, and let the adjustable actuator 100 drive the optical lens sheet group 200 to move to different focus positions (preferably, the optical lens sheet group 200 is driven to complete the entire stroke of the adjustable actuator 100, so that the dynamic tilt of the entire stroke can be obtained and adjusted). When the optical lens sheet group 200 is in a certain focus position, it is detected whether the laser light reflected by the optical lens sheet group 200 at this time has a dynamic offset and an offset amount, and a corresponding dynamic tilt amount is converted according to the offset amount. Alternatively, the test method of the dynamic tilt amount may let the optical lens sheet group 200 be at different focus positions to take a photograph for the same test target plate, and determine whether there is a dynamic offset and an offset amount according to the obtained photographing result. That is to say, the test method of the dynamic tilt amount is not limited, and those skilled in the art can use other implementable methods to execute the step 305.

It is worth mentioning that the step 303 and the step 305 can be executed simultaneously or separately.

Step 307: a static adjusting electric quantity of each adjustment coil of an adjustment coil group is analyzed according to the static tilt amount.

Figure 5A:
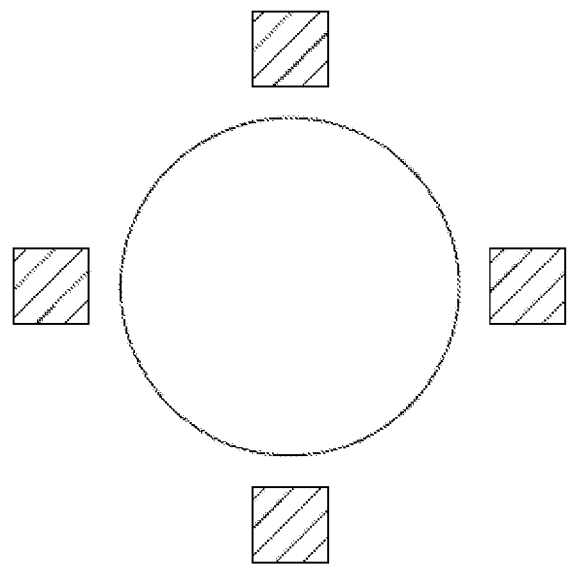
FIG. 5A is a schematic view of an implementation of an adjustment coil group of an adjustable camera module according to the present disclosure.
Figure 5B:
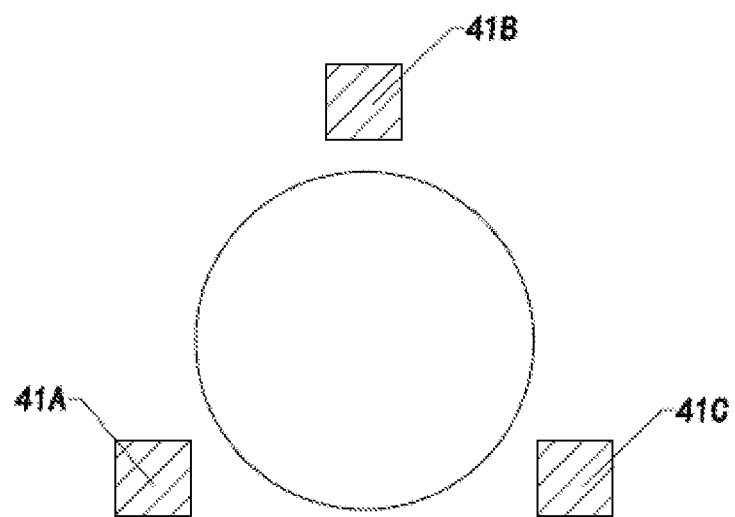
FIG. 5B is a schematic view of another implementation of the adjustment coil group of the adjustable camera module according to the present disclosure.

In order to realize the adjustment of the optical lens sheet group 200, the adjustment coil group 40 includes at least three independent adjustment coils 41, which are distributed on an outer side of the optical lens sheet group 200 and provide a plurality of adjustment points, as shown in FIGS. 5A and 5B. After being powered on, the adjustment coils 41 are subjected to electromagnetic force and move up or down along their respective Z-axis directions (a direction perpendicular to the photosensitive chip) to drive the optical lens sheet group 200 to rotate and align it with the photosensitive chip, namely, causing the imaging surface of the optical lens sheet group 200 and the imaging surface of the photosensitive chip 410 to be substantially parallel.

Three adjustment coils are taken as an example for explanation, wherein the three adjustment coils can be distributed in an equilateral triangle, an isosceles triangle, a right triangle or the like, which is not limited here. It is assumed that after the step 301 is executed, the optical lens sheet group 200 and the adjustable actuator 100 are assembled in a state as shown in FIG. 3A. In the step 303, the static tilt amount is obtained according to the defocus curve, and according to the static tilt amount, the three adjustment coils need to be moved in different directions and electric quantities. At this time, the first adjustment coil 41A needs to move downwards, the second adjustment coil 41B needs to move upwards, and the third adjustment coil 41C may not need to move, or needs to move upwards or downwards to compensate for the static tilt amount. Correspondingly, the static adjusting electric quantities required by the three adjustment coils 41 are different. The first adjustment coil 41A refers to a static adjusting electric quantity $I_A$, the second adjustment coil 41B refers to a static adjusting electric quantity $I_B$, and the third adjustment coil 41C refers to a static adjusting electric quantity $I_C$.

Step 309: dynamic adjusting electric quantities of each adjustment coil of the adjustment coil group 40 at respective focus positions are analyzed according to the dynamic tilt amount.

Similar to the static tilt adjustment, the dynamic tilt adjustment is also provided with adjustment force by a plurality of independent adjustment coils 41. Different focus positions correspond to different dynamic tilt amounts, and corresponding dynamic adjusting electric quantities required by each adjustment coil are also different.

Three adjustment coils are still taken as an example for explanation, wherein the three adjustment coils can be distributed in an equilateral triangle, an isosceles triangle, a right triangle or the like, which is not limited here. It is assumed that when the optical lens sheet group 200 is moved to position $L_1$, its dynamic tilt state is as shown in FIG. 4A and FIG. 5B. For the dynamic tilt amount measured at this time, the first adjustment coil 41A needs to move downwards, the second adjustment coil 41B needs to move upwards, and the third adjustment coil 41C may not need to move, or needs to move upwards or downwards to compensate for the dynamic tilt amount. Correspondingly, the first adjustment coil 41A refers to a dynamic adjusting electric quantity $I_{a1}$, the second adjustment coil 41B refers to a static adjusting electric quantity $I_{a2}$, and the third adjustment coil 41C refers to a static adjusting electric quantity $I_{c1}$.

Moreover, when the optical lens sheet group 200 is moved to position $L_2$, its dynamic tilt state is as shown in FIG. 4B and FIG. 5B. For the dynamic tilt amount measured at this time, the first adjustment coil 41A needs to move upwards, the second adjustment coil 41B needs to move downwards, and the third adjustment coil 41C may not need to move, or needs to move upwards or downwards to compensate for the dynamic tilt amount. Correspondingly, the first adjustment coil 41A refers to a dynamic adjusting electric quantity $I_{a2}$, the second adjustment coil 41B refers to a static adjusting electric quantity $I_{a2}$, and the third adjustment coil 41C refers to a static adjusting electric quantity $I_{c2}$.

Step 311: the static adjusting electric quantity required by each of the adjustment coils is supplied to the adjustable camera module.

Step 313: an adjusted defocus curve is measured, wherein if the defocus curve is measured after adjustment, and it indicates that the static tilt amount is within an acceptable error range, then the static adjusting electric quantity required by each of the adjustment coils is burned; and if the static tilt amount exceeds an acceptable error range, then the step 303 and the step 307 are repeated.

When the adjustable camera module obtains the corresponding static adjusting electric quantities, each of the adjustment coils 41 is forced to drive the optical lens sheet group 200 to rotate to an adjustment position. At this time, the optical lens sheet group 200 is again used for photographing for the four positions of the upper left, upper right, lower left, and lower right of the module test image to obtain a corresponding defocus curve after adjustment.

Figure 3D:
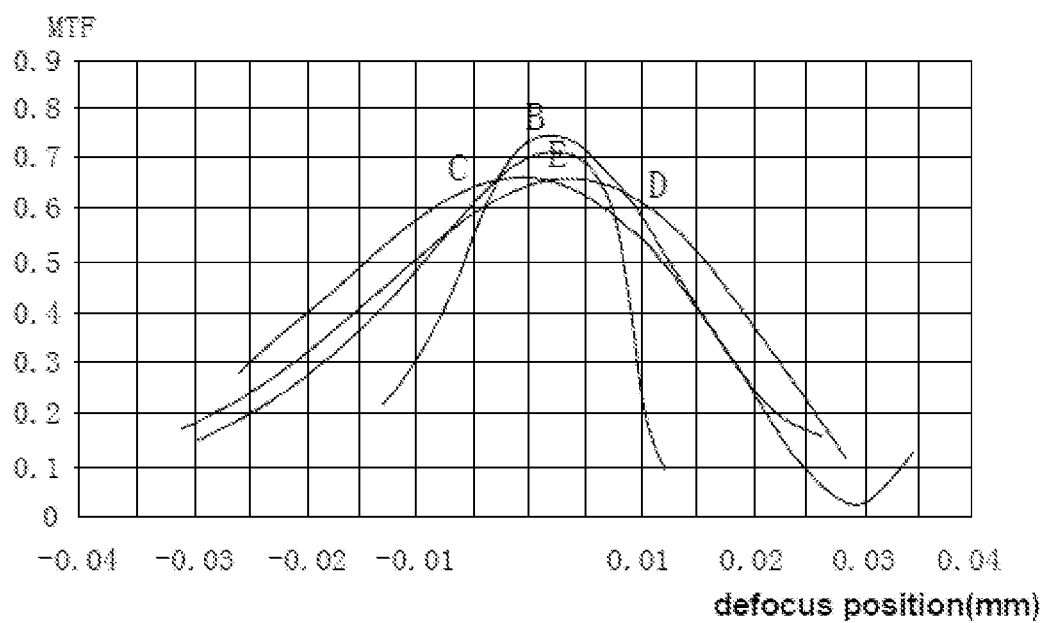
FIG. 3D is a schematic view of a measured defocus curve after adjusting a static tilt amount of an adjustable camera module according to the present disclosure.

As shown in FIG. 3D, when the adjustable camera module obtains the corresponding static adjusting electric quantities, the measured defocus curve indicates that the position difference of each field of view is within an acceptable error range. In some embodiments of the present disclosure, the static adjusting electric quantity required by each of the adjustment coils can be burned into a driving chip of the adjustable actuator 100. In other embodiments of the present disclosure, a recording chip is provided on the circuit board 430 for burning the static adjusting electric quantities, or the static adjusting electric quantities are burned in the photosensitive chip 410. The adjustable actuator 100 is connected to the circuit board 430 through pins, and obtains the burned static adjusting electric quantities.

Step 315: the optical lens sheet group is driven to move to a different focus position, and the dynamic adjusting electric quantity required by each of the adjustment coils corresponding to the focus position is supplied to the adjustable camera module.

Step 317: an adjusted dynamic tilt amount is measured, and if the adjusted dynamic tilt amount is within an acceptable error range, the dynamic adjusting electric quantity required by each of the adjustment coils corresponding to the focusing position is burned; and if the adjusted dynamic tilt amount exceeds the acceptable error range, the step 305 and the step 309 are repeated.

It is worth mentioning that the test and compensation of the static tilt amount will not affect the test and compensation of the dynamic tilt amount, and the order between the two is not limited. The manufacturers can burn the static adjusting electric quantity required by each of the adjustment coils, and then execute the step 315 and the step 317. That is, after the step 313 is executed, the static adjusting electric quantities required to compensate for the static tilt amount can be obtained. At this time, the corresponding static adjusting electric quantities are first supplied to compensate for the static tilt amount of the optical lens sheet group 200, and then the dynamic adjusting electric quantities required by each of the adjustment coils corresponding to the focus position are supplied to test whether the dynamic tilt amount is compensated. Correspondingly, the dynamic adjusting electric quantities may be burned in the driving chip of the adjustable actuator 100, or may be burned in the photosensitive chip 410 or the recording chip additionally configured. Alternatively, there is no need to introduce the corresponding static adjusting electric quantities, and the step 315 and the step 317 are directly executed.

When in use, the adjustable camera module is mounted on a mobile terminal, such as a mobile phone, a tablet or the like. When a user needs to take a photograph, the camera module is triggered to start, the recorded static adjusting electric quantities are read, the corresponding static adjusting electric quantities are supplied to the adjustment coil group 40, and the optical lens sheet group 200 is aligned to start photographing. When the focus function of the camera module is triggered and the optical lens sheet group 200 moves, according to the moving focus position of the optical lens sheet group 200, the recorded dynamic adjusting electric quantities are read, the corresponding dynamic adjusting electric quantities are supplied to the adjustment coil group 40, and the dynamic tilt amount at this time is compensated. Accordingly, compared with when the static adjusting electric quantities and/or dynamic adjusting electric quantities have not been compensated, the resolution of the camera module is improved, and the performance is increased.

Alternatively, the adjustable camera module first compensates for the dynamic tilt amount, and then compensates for the static tilt amount. That is, when the user needs to take a photograph, the focus function of the camera module is triggered. When the optical lens sheet group 200 moves, according to the moving to focus position of the optical lens sheet group 200, the recorded dynamic adjusting electric quantities are read, the corresponding dynamic adjusting electric quantities are supplied to the adjustment coil group 40, and the dynamic tilt amount at this time is compensated. After that, the recorded static adjusting electric quantities are read, the corresponding static adjusting electric quantities are supplied to the adjustment coil group 40, and the optical lens sheet group 200 is aligned.

Further, a common camera module on the market is an AF camera module, which can realize auto focusing. This is realized by driving the optical lens sheet group 200 through an auto focus coil 70 of the adjustable actuator 100. The dynamic focus coil surrounds the optical lens sheet group 200. For example, it is sleeved on the outer peripheral wall of the lens barrel 220. When the camera module determines an object to be photographed and a distance between the object to be photographed and the photosensitive element 410, the auto focus coil 70 is supplied with an electric quantity to drive the optical lens sheet group 200 to the corresponding focus position.

Figure 7:
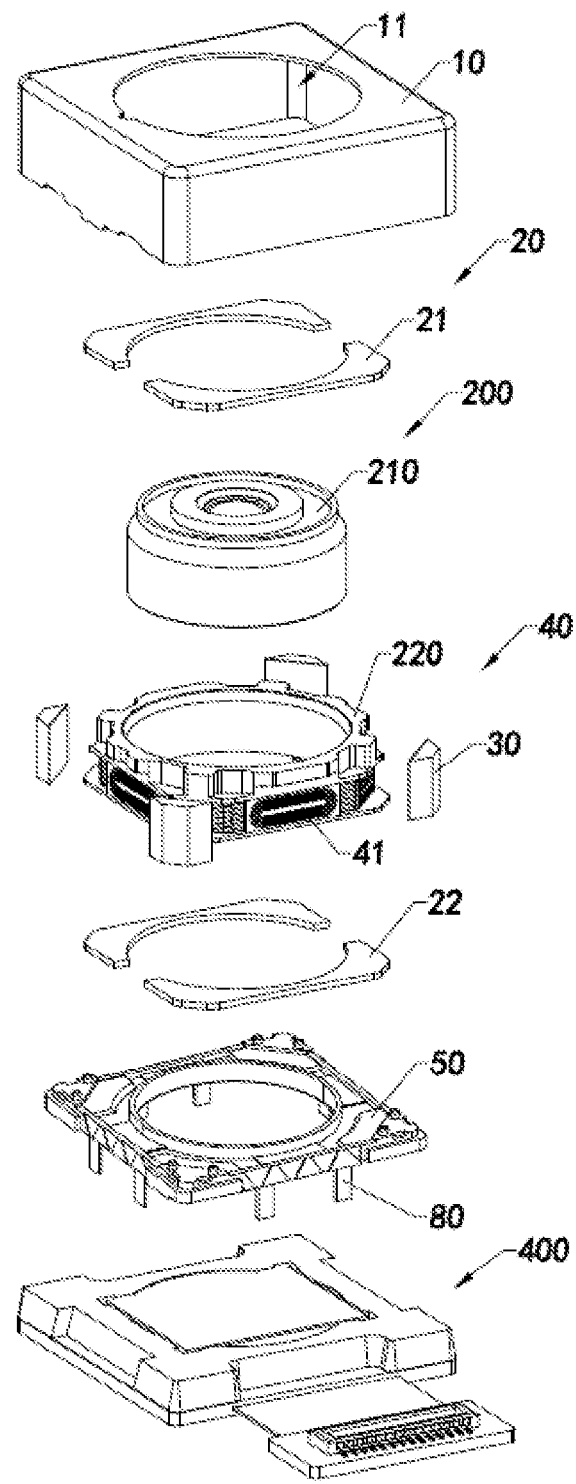
FIG. 7 is an exploded view of an adjustable camera module according to another embodiment of the present disclosure.
Figure 8:
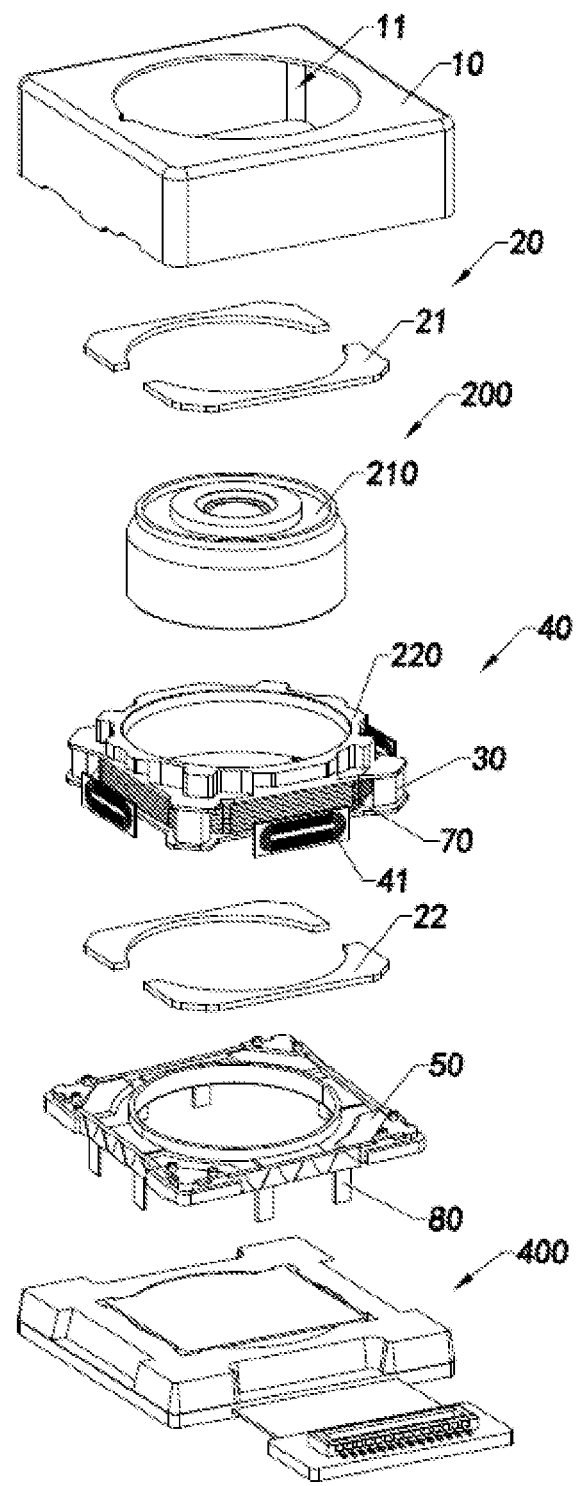
FIG. 8 is an exploded view of an adjustable camera module according to another embodiment of the present disclosure.

In some embodiments of the present disclosure, the auto focus coil 70 and the adjustment coil group 40 coexist. The adjustment coil group 40 is distributed on an outer side of the auto focus coil 70. When the adjustment coil group 40 compensates for the static tilt amount and/or dynamic tilt amount, the auto focus coil 70 operates to realize auto focusing, as shown in FIGS. 7 and 8.

Figure 6:
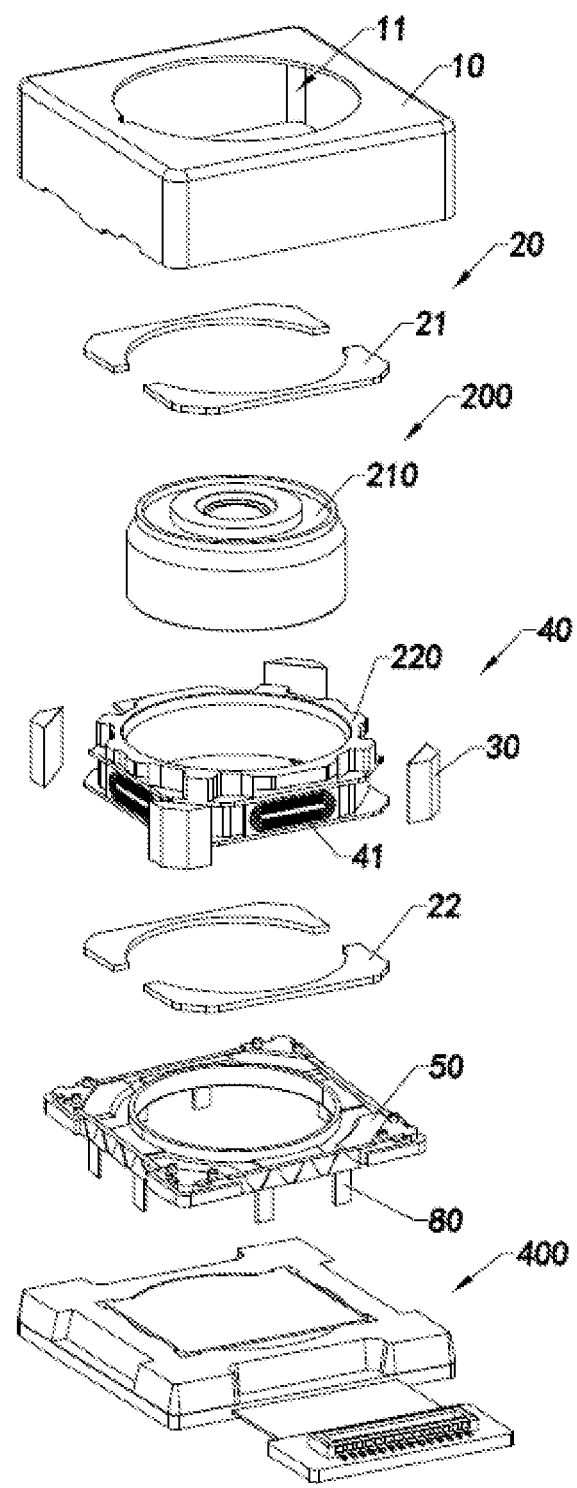
FIG. 6 is an exploded view of an adjustable camera module according to an embodiment of the present disclosure.

In some other embodiments of the present disclosure, the adjustment coil group 40 replaces the auto focus coil 70 to realize the auto focus function, as shown in FIG. 6.

Step 319: according to different focus positions, driving current magnitudes corresponding to each of the adjustment coils are preset.

When the distance between the object to be photographed and the photosensitive element 410 is different, the focus position of the optical lens sheet group 200 is different, and the driving current magnitude corresponding to each adjustment coil is also different. Presetting of the driving current magnitude can be directly calculated and analyzed through the overall design of the camera module during adjustment. For example, through the design parameters of the spring pieces, magnets, and adjustment coils, the driving current magnitude corresponding to each distance scale can be correspondingly obtained, thereby presetting the driving current magnitude.

Step 321: the driving current magnitude corresponding to each of the adjustment coils is supplied to the camera module.

Step 323: it is detected whether focusing is successful after a driving electric quantity is input, and if the focusing is successful, the driving current magnitude corresponding to each of the adjustment coils is burned; and if it is unsuccessful, the step 319 and the step 321 are repeated.

At this time, since the adjustment coil group 40 replaces the auto focus coil 70, preferably, the steps 319 to 323 are executed before the steps 303 to 317. That is to say, the driving current magnitude required by the adjustment coil group 40 is first measured and burned, and then the static adjusting current magnitude and the dynamic adjusting current magnitude are measured and burned. Therefore, the adjustment coil group 40 is supplied with the corresponding required driving current to drive the optical lens sheet group 200 to focus and move, which facilitates the measurement of the static adjusting current magnitude and dynamic adjusting current magnitude, and also facilitates the obtainment of the accurate static adjusting current magnitude and dynamic adjusting current magnitude.

During use, when the static adjusting current magnitude and/or dynamic adjusting current magnitude are/is compensated, the preset driving current magnitude is read, and a driving current magnitude corresponding to the focus position is supplied to the adjustment coil group 40. Each adjustment coil 41 drives the optical lens sheet group 200 until the optical lens sheet group 200 moves to a position where the image is clearest. That is to say, in the present disclosure, the adjustment coil group 40 can not only compensate for the static adjusting current magnitude and/or dynamic adjusting current magnitude, but also drive the optical lens sheet group 200 to focus. The presetting and recording in the production stage will make the compensation and driving in the use process more flexible and rapid.

In an embodiment of the present disclosure, the assembly test method for the adjustable camera module may use the adjustable actuator 100 mentioned below. However, those skilled in the art may know that this is only an illustration and not a limitation. The assembly test method for the adjustable camera module may also adopt an adjustable actuator having an adjustment coil group 40 with other structures, as shown in FIGS. 6 to 8.

Specifically, the adjustable actuator 100 includes a frame main body 10, an elastic assembly 20, at least one magnet 30, the adjustment coil group 40, and a base 50. The frame main body 10 and the base 50 are coupled to define an installation cavity 60, and the elastic assembly 20, the magnet 30, the optical lens sheet group 200 and the adjustment coil group 40 are accommodated and fixed in the installation cavity 60, so that the optical lens sheet group 200 is driven by the adjustment coil group 40 to adjust the dynamic tilt amount and the static tilt amount.

The shape of the frame main body 10 is not limited, and it is preferably a square frame for fixing and accommodating other elements. The frame main body 10 has a magnetic permeability function, which improves the effective utilization of the magnet 30. The frame main body 10 has a light passing hole 11 corresponding to a light path of the optical lens sheet group 200. That is to say, the frame main body 10 surrounds the optical lens sheet group 200, and its light passing hole 11 corresponds to an optical path of the optical lens sheet group 200. When a consumer takes a photograph, light reflected by the objected to be photographed is captured by the optical lens sheet group 200 through the light passing hole 11. The coupling structure of the frame main body 10 and the base 50 may be snapping, screwing, bonding or the like. The present application is not limited thereto.

When the adjustment coil group 40 obtains the preset adjusting electric quantities or driving electric quantity, the lens barrel 220 drives the optical lens 210 to move, thereby adjusting or auto-focusing. The magnet 30 may be implemented as a magnet, a permanent magnet or the like, and is fixed in the containing cavity 60. In an embodiment of the present disclosure, the adjustment coil group 40 is fixed to the outer peripheral wall of the lens barrel 220, and the respective adjustment coils 41 are distributed at intervals. For example, the top edge and the bottom edge of the lens barrel 220 extend outwards to form a plurality of top fixing elements and corresponding bottom fixing elements, respectively, and the top and low ends of the adjustment coil 41 are fixed to the top fixing elements and the corresponding bottom fixing elements, respectively. The magnets 30 are fixed to the inner side wall of the frame main body 10, are located at inner corners of the frame main body 10, and may be in the quadrangular trapezoidal shape. In another embodiment of the present disclosure, the respective adjustment coils 41 are fixed to the inner side wall of the frame main body 10 at intervals, and the magnets 30 are fixed to the outer side wall of the lens barrel 220 at intervals.

The elastic assembly 20 is used to keep the optical lens sheet group 200 stable and balance the electromagnetic force. The elastic assembly 20 can be implemented as a coil spring, a leaf spring or the like, and the present application is not limited thereto. In an embodiment of the present disclosure, the elastic assembly 20 includes an upper elastic piece 21 and a lower elastic piece 22, wherein the upper elastic piece 21 is mounted on a top end of the optical lens sheet group 200, and the lower elastic piece 22 is mounted on a lower end of the optical lens sheet group 200. When the adjustment coil group 40 is powered on to apply force, the upper elastic piece 21 and the lower elastic piece 22 balance the force exerted by the adjustment coil group 40. Especially when the adjustment coil group 40 is supplied with the driving electric quantity to realize focusing, the driving electric quantity generates an upward ampere force under the action of a magnetic field, which pushes the optical lens sheet group 200 to move upwards. Moreover, when the upward electromagnetic force received by the optical lens sheet group 200 balances the elastic force of the elastic assembly 20, the optical lens sheet group 200 stays at a corresponding distance scale to realize focusing.

The adjustable actuator 100 includes a plurality of pairs of pins 80, and each pair of pins 80 corresponds to one of the adjustment coils 41. The pins 80 are communicatively connected to the circuit board 420. On the one hand, electricity power is obtained. On the other hand, when the preset driving electric quantity and the adjusting electric quantities are recorded on the photosensitive chip 410 or the recording chip, corresponding data can be read through the pins 80.

Further, in another embodiment of the present disclosure, as shown in FIGS. 7 and 8, the adjustable actuator 100 further includes the auto focus coil 70, and the auto focus coil 70 surrounds the optical lens sheet group 200 and is used to realize auto focusing. That is to say, in this embodiment, the adjustment coil group 40 and the auto focus coil 70 coexist, the adjustment coil group 40 compensates for the static tilt amount and the dynamic tilt amount, and auto focusing is realized by the auto focus coil 70. At this time, the auto focus coil 70 generates an upward ampere force under the action of the magnetic field, which pushes the optical lens sheet group 200 to move upwards. Moreover, when the upward electromagnetic force received by the optical lens sheet group 200 balances the elastic force of the elastic assembly 20, the optical lens sheet group 200 stays at a corresponding distance scale to realize focusing.

The installation position of the auto focus coil 70 is not limited, and it can be combined with the installation position of the adjustment coil group 40 and the magnet 30 to form various implementations.

For example, in some embodiments, the auto focus coil 70 is fixed to surround the outer side wall of the lens barrel 220, and the upper and lower edges of the lens barrel 220 extend laterally and outwards to form an upper protective layer and a lower protective Layer, which cover the auto focus coil 70 to prevent the auto focus coil 70 from being impacted and short-circuited. At this time, the adjustment coil group 40 is also fixed to the outer peripheral wall of the lens barrel 220, and the respective adjustment coils 41 are distributed at intervals. For example, the top and low ends of the adjustment coil 41 are fixed to the protective layer and the lower protective layer, respectively. The magnets 30 are fixed to the inner side wall of the frame main body 10, and are located at inner corners of the frame main body 10.

Alternatively, when the auto focus coil 70 fixedly surrounds the outer side wall of the lens barrel 210, the magnets 30 are also fixed to the outer side wall of the lens barrel 220, the upper and lower ends are fixed to the protective layer and the lower protective layer, respectively, and the adjustment coils 41 are fixed to the inner side wall of the frame main body 10, for example, by means of snapping or the like.

Alternatively, the adjustment coil group 40 is placed at the bottom of the optical lens sheet group 200, and is located on an FPC circuit board of the adjustable actuator. Specifically, the adjustment coil group 40 is formed or fixed to the FPC circuit board, and is conductively connected to the FPC circuit board. The FPC board with the adjustment coil group 40 is fixed to the bottom of the optical lens sheet group 200.

Figure 9:
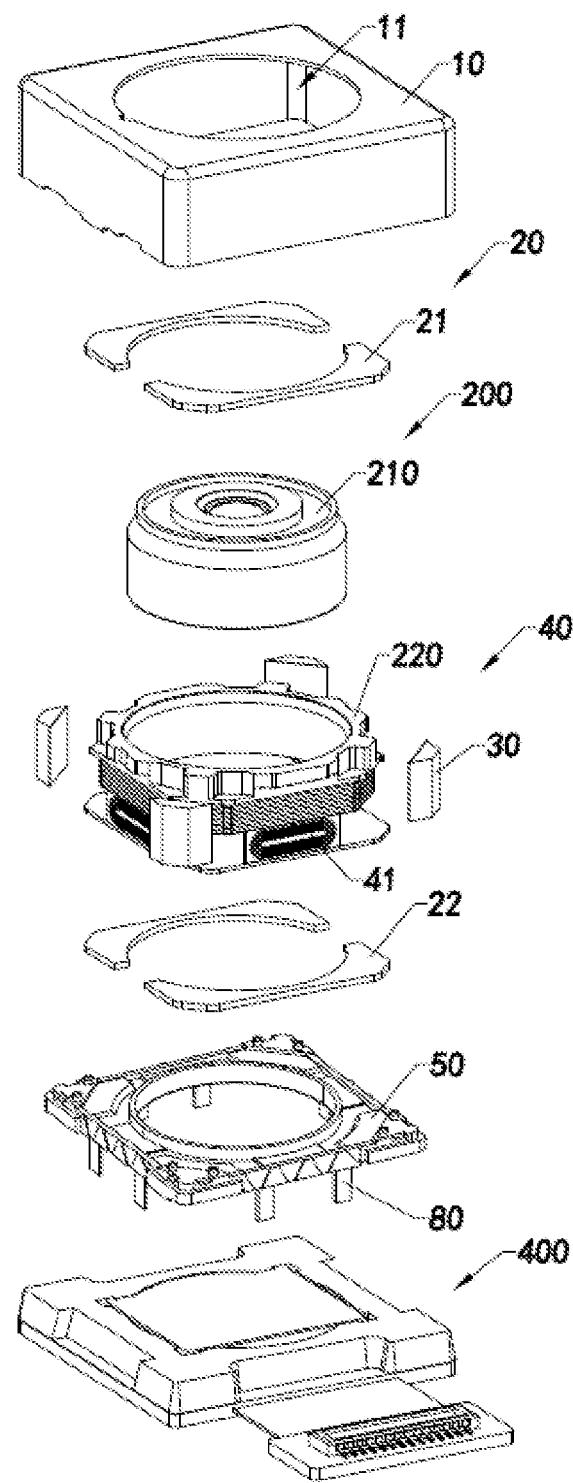
FIG. 9 is an exploded view of an adjustable camera module according to another embodiment of the present disclosure.

Alternatively, the adjustment coil group 40 is fixed below the auto focus coil 70, as shown in FIG. 9. The adjustment coils 41 are fixed to the outer side wall of the lens barrel 220. In this embodiment, the adjustment coils 41 are in a plane shape. The plane where the adjustment coils 41 are located is substantially parallel to the outer side wall of the lens barrel 220. In addition, in another embodiment of the present disclosure, the adjustment coils 41 may also be fixed laterally, that is, the coil winding directions of the adjustment coils 41 is consistent with the circumferential direction of the lens 220.

It should be understood by those skilled in the art that the multiple combined structure installation methods here indicate that the structure of the adjustable actuator 100 has little effect on the assembly test method for the adjustable camera module of the present disclosure, and at the same time, the above specific structure is only for convenience of elaboration and specific description, and is not a limitation.

It should be understood by those skilled in the art that the embodiments of the present disclosure described in the above description and shown in the drawings are only examples and do not limit the present application. The objectives of the present application have been achieved completely and efficiently. The function and structural principles of the present disclosure have been presented and described in the embodiments, and the embodiments of the present disclosure may be varied or modified without departing from the principles.

The invention claimed is:

1. A assembly test method for an adjustable camera module, comprising:
   (a) assembling an optical lens sheet group, an adjustable actuator and a photosensitive assembly to form an adjustable camera module;
   (b) measuring a static tilt amount between the optical lens sheet group and the photosensitive assembly by performing a defocus curve test on the adjustable camera module;
   (c) analyzing a static adjusting electric quantity of each of adjustment coils of an adjustment coil group according to the static tilt amount; and
   (d) supplying the static adjusting electric quantity required by each of the adjustment coils to the adjustable camera module; and
   (e) measuring an adjusted defocus curve, wherein if the defocus curve is measured after adjustment, and it indicates that the static tilt amount is within an acceptable error range, then the static adjusting electric quantity required by each of the adjustment coils is burned; and if a position difference exceeds an acceptable error range, then the steps (b), (c) and (d) are repeated.

2. The assembly test method for the adjustable camera module according to claim 1, further comprising the following steps:
   (f) measuring dynamic tilt amounts corresponding to the adjustable camera module at different focus positions; and
   (g) according to the dynamic tilt amounts, analyzing dynamic adjusting electric quantities required by each of the adjustment coils of the adjustment coil group at the respective focus positions.

3. The assembly test method for the adjustable camera module according to claim 2, further comprising the following steps after the step (e):
   (h) driving the optical lens sheet group to move to a different focus position, and supplying a dynamic adjusting electric quantity required by each of the adjustment coils corresponding to the focus position to the adjustable camera module; and
   (i) measuring an adjusted dynamic tilt amount, and if the adjusted dynamic tilt amount is within an acceptable error range, burning the dynamic adjusting electric quantity required by each of the adjustment coils corresponding to the focus position; and if the adjusted dynamic tilt amount exceeds the acceptable error range, repeating the step (f) and the step (g).

4. The assembly test method for the adjustable camera module according to claim 3, further comprising the following steps:
   (j) according to the different focus position, presetting a driving current magnitude corresponding to each of the adjustment coils.

5. The assembly test method for the adjustable camera module according to claim 4, further comprising the following steps:
   (k) after supplying the burned static adjusting electric quantity and the dynamic adjusting electric quantity of the corresponding focus position to the adjustable camera module, supplying a preset driving current magnitude corresponding to each of the adjustment coils; and
   (l) detecting whether focusing is successful after a driving electric quantity is input, and if the focusing is successful, burning the driving current magnitude corresponding to each of the adjustment coils; and if it is unsuccessful, repeating the step (j) and the step (k).

6. The assembly test method for the adjustable camera module according to claim 1, further comprising the following steps:
   (m) supplying a preset driving current magnitude to each of the adjustment coils; and
   (n) detecting whether focusing is successful after the driving electric quantity is input, and if the focusing is successful, burning the driving current magnitude corresponding to each of the adjustment coils; and if it is unsuccessful, repeating the step (m).

7. A assembly test method for an adjustable camera module, comprising:
   (A) assembling an optical lens sheet group, an adjustable actuator and a photosensitive assembly to form an adjustable camera module;
   (B) measuring dynamic tilt amounts corresponding to the adjustable camera module at different focus positions;
   (C) according to the dynamic tilt amounts, analyzing dynamic adjusting electric quantities required by each of the adjustment coils of the adjustment coil group at the respective focus positions;
   (D) driving the optical lens sheet group to focus, and supplying the dynamic adjusting electric quantity required by each of the adjustment coils corresponding to a focus position to the adjustable camera module; and
   (E) measuring an adjusted dynamic tilt amount, and if the adjusted dynamic tilt amount is within an acceptable error range, burning the dynamic adjusting electric quantity required by each of the adjustment coils corresponding to the focus position; and if the adjusted dynamic tilt amount exceeds the acceptable error range, repeating the step (B) and the step (C).

8. An adjustable camera module, comprising:
   the adjustable camera module being manufactured according to the assembly test method of claim 1, wherein the adjustable actuator supports the optical lens sheet group and is mounted on the top of the photosensitive assembly, and the optical lens sheet group corresponds to a photosensitive path of the photosensitive assembly.

9. The adjustable camera module according to claim 8, wherein the adjustable actuator comprises a frame main body, an adjustment coil group, at least one magnet and a base; wherein the frame main body and the base are coupled to define an installation cavity, and the elastic assembly, the magnet, the optical lens sheet group and the adjustment coils are accommodated and fixed in the installation cavity; and wherein when corresponding static adjusting electric quantities are supplied to the adjustment coil group, under the action of the magnet, the optical lens sheet group is driven by the adjustment coils to adjust the static tilt amount, so as to facilitate the optical lens sheet group to focus.

10. The adjustable camera module according to claim 9, wherein when the optical lens sheet group is driven to focus, the adjustment coils are supplied with the dynamic adjusting electric quantities corresponding to the focus position, and under the action of the magnet, the optical lens sheet group is driven by the adjustment coils to compensate for the dynamic tilt amount.

11. The adjustable camera module according to claim 10, wherein the adjustable actuator further comprises an auto focus coil; wherein the auto focus coil surrounds the optical lens sheet group; and wherein when the optical lens sheet group is driven by the auto focus coil to focus, the adjustment coil group is supplied with corresponding dynamic adjusting electric quantities to compensate for the dynamic tilt amount.

12. The adjustable camera module according to claim 9, wherein the adjustment coil group is fixed on an outer peripheral wall of the optical lens sheet group, and the respective adjustment coils are distributed at intervals; and wherein the magnet is fixed to an inner side wall of the frame main body.

13. The adjustable camera module according to claim 9, wherein the respective adjustment coils are fixed to an inner side wall of the frame main body at intervals, and the magnets are fixed to an outer side wall of the lens barrel at intervals.

14. The adjustable camera module according to claim 9, wherein the adjustable actuator further comprises an auto focus coil; wherein the auto focus coil surrounds the optical lens sheet group; and wherein when corresponding static adjusting electric quantities are supplied to the adjustment coil group to compensate for the static tilt amount, then the auto focus coil realizes auto focus.

15. The adjustable camera module according to claim 9, wherein the adjustable actuator further comprises an auto focus coil; wherein the auto focus coil surrounds the optical lens sheet group; and wherein after the auto focus coil realizes auto focus, the adjustment coil group is supplied with corresponding static adjusting electric quantities to compensate for the static tilt amount.

16. The adjustable camera module according to claim 8, wherein the adjustable actuator comprises a frame main body, an adjustment coil group, at least one magnet and a base; wherein the frame main body and the base are coupled to define an installation cavity, and the elastic assembly, the magnet, the optical lens sheet group and the adjustment coils are accommodated and fixed in the installation cavity; and wherein when the optical lens sheet group is driven to focus, the dynamic adjusting electric quantities corresponding to the focus position is supplied to the adjustment coils, and under the action of the magnet, the optical lens sheet group is driven by the adjustment coils to compensate for the dynamic tilt amount.

17. The adjustable camera module according to claim 16, wherein the adjustment coil group is fixed on an outer peripheral wall of the optical lens sheet group, and the respective adjustment coils are distributed at intervals; and wherein the magnet is fixed to an inner side wall of the frame main body.

18. The adjustable camera module according to claim 16, wherein the respective adjustment coils are fixed to an inner side wall of the frame main body at intervals, and the magnets are fixed to an outer side wall of the lens barrel at intervals.

19. The adjustable camera module according to claim 16, wherein the adjustable actuator further comprises an auto focus coil; wherein the auto focus coil surrounds the optical lens sheet group; and wherein when the optical lens sheet group is driven by the auto focus coil to focus, the adjustment coil group is supplied with corresponding dynamic adjusting electric quantities to compensate for the dynamic tilt amount.

20. The adjustable camera module according to claim 8, wherein when corresponding static adjusting electric quantities and/or dynamic adjusting electric quantities are supplied to the adjustment coil group to compensate for the static tilt amount and/or dynamic tilt amount, then a driving electric quantity is supplied, and the adjustment coil group drives the optical lens sheet group to automatically focus.

\* \* \* \* \*